W. A. GILDAY.
ATTACHMENT FOR STEERING GEARS.
APPLICATION FILED MAR. 10, 1915.

1,172,275.

Patented Feb. 22, 1916.

Witnesses
Finton S. Belt
J. N. Sherwood

Inventor
William A. Gilday
By Franklin N. Hough
Attorney

UNITED STATES PATENT OFFICE.

WILLIAM A. GILDAY, OF PHILADELPHIA, PENNSYLVANIA.

ATTACHMENT FOR STEERING-GEARS.

1,172,275.

Specification of Letters Patent.

Patented Feb. 22, 1916.

Application filed March 10, 1915. Serial No. 13,462.

*To all whom it may concern:*

Be it known that I, WILLIAM A. GILDAY, a citizen of the United States, residing at Philadelphia, in the county of Philadelphia, and State of Pennsylvania, have invented certain new and useful Improvements in Attachments for Steering-Gears; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in attachments to steering gears of automobiles for setting the steering apparatus, the device being utilized in connection with the steering wheel and so positioned that, when set, the car will run a straight or curved line without the necessity of the hand of the operator being upon the wheel, thus leaving the operator free to manipulate the motor control.

The invention comprises various details of construction, combinations and arrangements of parts, which will be hereinafter fully described, shown in the accompanying drawings and then specifically defined in the appended claims.

Figure 1:
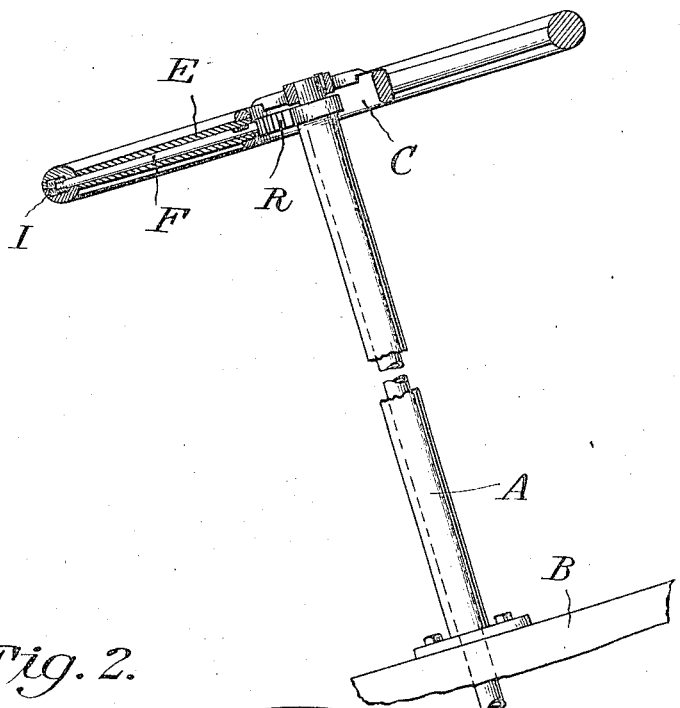
Figure 2:
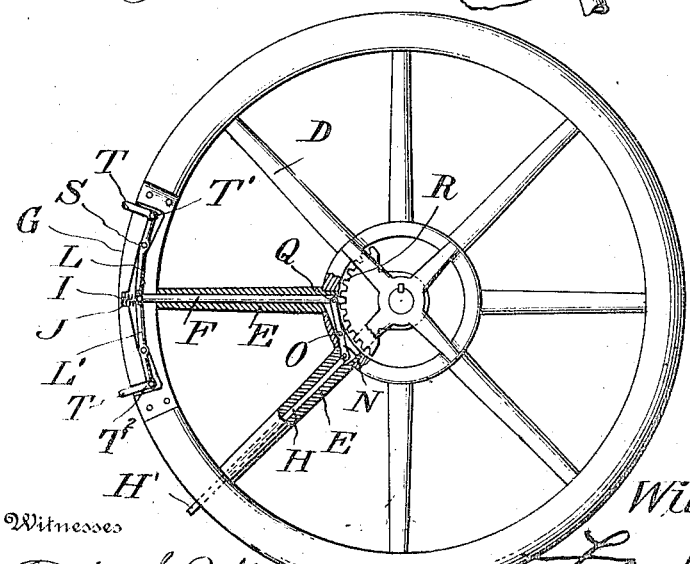

The invention is clearly illustrated in the accompanying drawings, in which:

Figure 1 is a sectional view through the steering wheel showing the application of the invention thereto. Fig. 2 is a top plan view of the wheel, and Fig. 3 is a detail sectional view through the rim showing a slight modification of the invention.

Reference now being had to the details of the drawings by letter, A designates a tubular shell which is fastened in any suitable manner to the body B of a vehicle, and C is a steering wheel having spokes D secured thereto and certain of the spokes E are provided with longitudinal apertures for the reception of the rods F and H. The rod H passes through an aperture in the rim of the wheel and its end H' projects beyond the circumference of the wheel. The inner end of the rod H is pivotally connected to the lever N, being mounted upon the pivot O, and the lever F is pivotally connected at Q to the other end of the lever N. The end of the lever F forms a pawl and is adapted to engage the teeth of the segment member R which is fixed to the tubular shell A. The outer end of the lever F is pivotally connected through the medium of a pin J with levers L and L' which are pivotally mounted upon the pins S, and T designates a push button which is pivotally connected at T', one to each end of the levers L and L', the push buttons passing through apertures $T^2$ formed in the rim of the wheel.

A spring I is interposed between the outer end of the lever F where it is pivotally connected with the levers L and L' and a recess formed in the inner edges of a curved segment plate G which is inserted in a recess in the steering handle.

Figure 3:
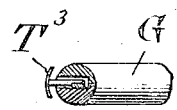

In Fig. 3 of the drawings, I have shown a curved plate $T^3$ which is fastened to one of the push buttons and which may be utilized, if desired, instead of the form shown in Fig. 2, said plate being adapted to be held by the hand of the operator against the rim when pressure is applied thereto.

In operation, when the steering wheel is set, the inner end of the lever F, serving as a pawl, engages one or another of the teeth of the segment member R and, should it be desired to allow the steering wheel to be turned to change the course, the operator by pushing in upon either the end of the rod H or either of the push buttons T, the pawl may be thrown out of engagement with the segment gear, thus allowing the wheel to turn freely.

What I claim to be new is:

1. In combination with a steering wheel, a tubular shell and segment wheel fastened thereto, a pawl mounted upon the wheel for engagement with the teeth of the segment, a lever mounted upon the wheel and pivoted to said pawl, and push buttons connected to the pawl and extending through apertures in the circumference of the wheel.

2. In combination with a steering wheel, a tubular shell, a toothed segment fastened thereto, said wheel having spokes with longitudinal apertures leading therethrough and through the rim of the wheel, a lever pivoted to the wheel, rods pivoted one to each end of the lever, the end of one rod serving as a pawl, the ends of the rods extending into the rim of the wheel.

3. In combination with a steering wheel and steering shaft to which the same is fastened, a toothed segment, said wheel having spokes which are longitudinally apertured, a lever pivoted upon the wheel, rods pivotally connected to said lever and passing through said apertures, one end of one rod serving as a pawl for engagement with the teeth of the segment wheel, levers carried by the rim of the wheel and pivoted to one of said rods, push buttons pivotally connected to the levers upon the rim, and a spring for holding the pawl in engagement with the teeth of the rack bar.

4. In combination with a steering wheel and steering shaft to which the same is fastened, a toothed segment fixed to the wheel, said wheel having spokes which are longitudinally apertured, the rim of the wheel recessed, a plate secured to the rim, spring-pressed levers pivotally mounted upon the plate in said recess, rods passing through apertures in the spokes and to one of which rods the inner ends of said levers are pivoted, a lever pivoted upon the wheel near the inner ends of the rods, one of the latter serving as a pawl for engagement with the teeth of said segment, and push buttons connected to said levers and projecting beyond the rim of the wheel.

In testimony whereof I hereunto affix my signature in presence of two witnesses.

WILLIAM A. GILDAY.

Witnesses:
H. E. SHORTLIDGE,
ADA M. GILDAY.